Patented Apr. 9, 1929.

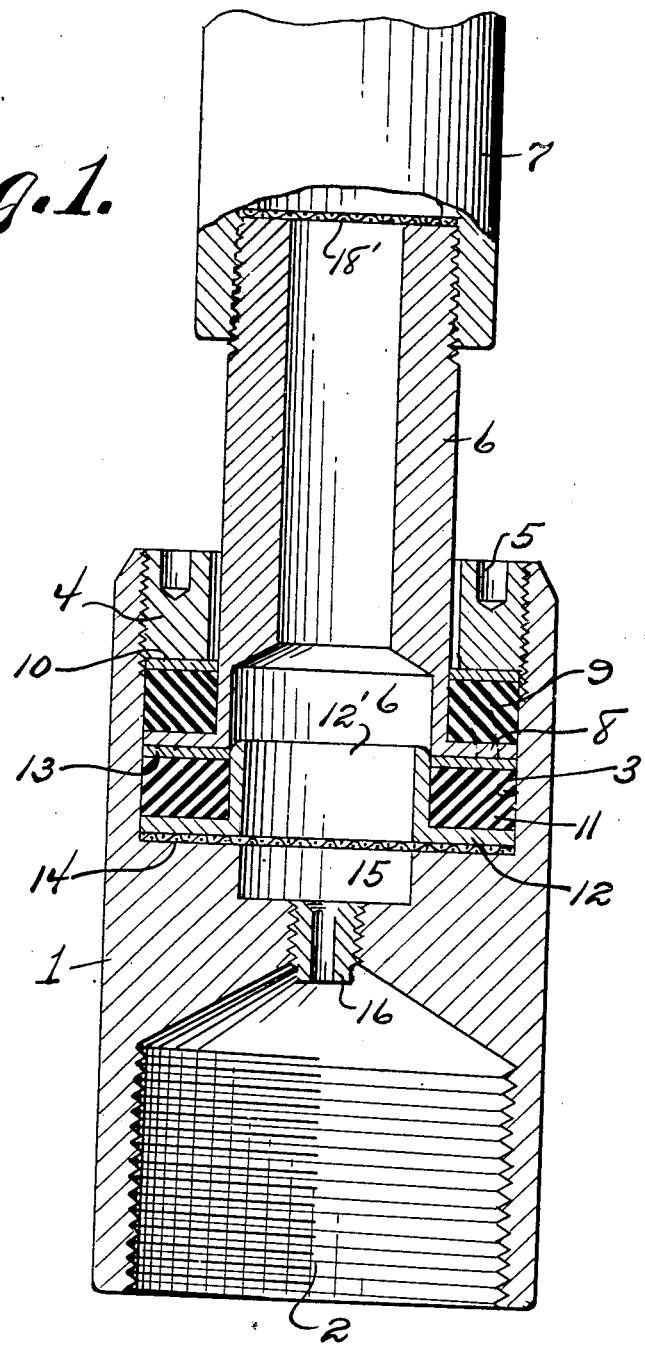

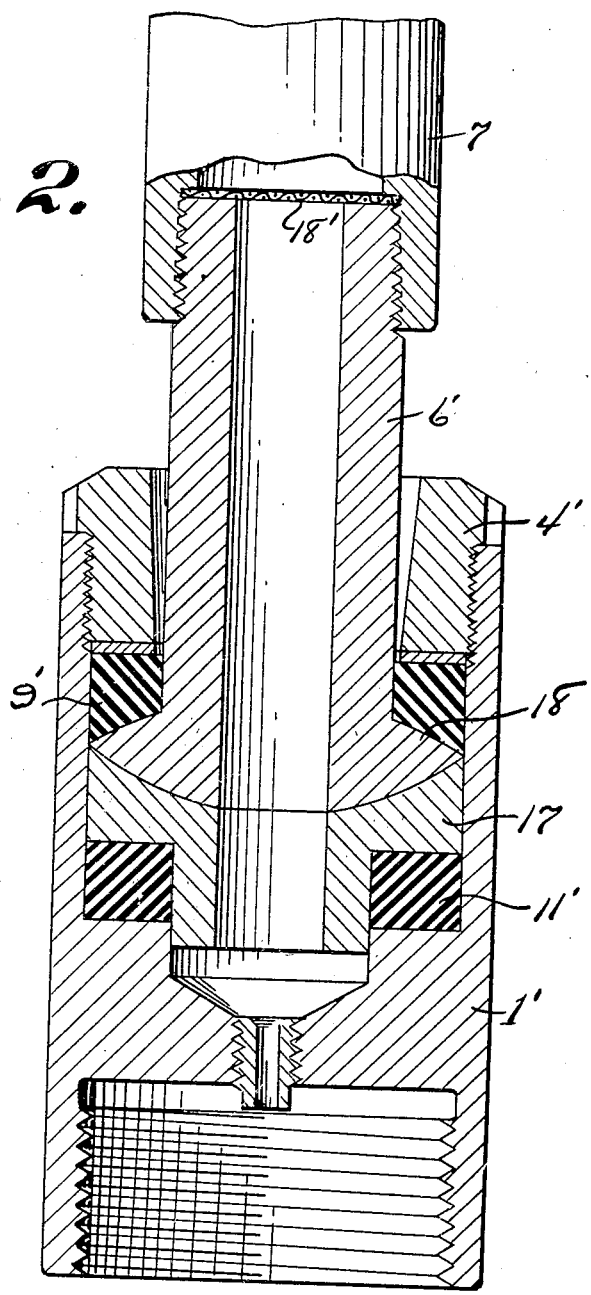

1,708,736

UNITED STATES PATENT OFFICE.

HARRY A. PALLADY, OF TONKAWA, OKLAHOMA.

COUPLING.

Application filed September 4, 1926. Serial No. 133,634.

This invention relates to a flexible coupling, the general object of the invention being to provide means for connecting pipes or conduits together in such a manner that they can have relative movement while maintaining a tight joint between them.

While the invention is mainly designed for rotary drilling rigs and in conjunction with the oil system thereof, it will, of course, be understood that the invention has other uses.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing one form of the invention.

Figure 2 is a sectional view through another form of the invention.

Referring to Figure 1, 1 indicates a body which is formed with a threaded socket 2 at its lower end which, in this case, is designed to fit the standard water cage on a rock bit and with a socket 3 in its upper end, the upper wall of which is threaded to receive a nut 4 which is provided with the spanner receiving recesses 5. The pipe connection 6 which is connected with the lubricant supplying pipe 7 extends into the socket 3 and has a flange 8 which snugly fits the socket. The member 6 is of considerably less diameter than the interior diameter of the nut 4, through which it passes, so that said member 6 can have rocking movement without interference on the part of the nut. A gasket 9 is arranged between the flange 8 and the nut 4, a washer 10 being arranged between the nut and gasket and a second gasket 11 is placed between a retainer 12 and a washer 13 which engages the flange 8. The retainer 12 has a cylindrical part 12' which is adapted to have telescopic action in the recess 6' formed at the end of the member 6. A filter screen 14 is held in place by the retainer 12, the socket 3 having a reduced inner part 15 which receives the oil passing through the screen and which is in communication with the socket 2 by means of the threaded nipple 16.

Thus it will be seen that the member 1 and the member 6 have relative movement without interrupting the oil passage and without causing a leaky joint between the parts, as the flanges and gaskets will permit movement between the parts while preventing leakage of oil.

In Figure 2, a member 17 is placed in the upper socket of the body 1' and said member has a concaved upper face for receiving the convex face of the head 18 formed on the member 6'. A gasket 9' is placed above the head 18 and the nut 4' and a gasket 11' is placed around the reduced lower part of the member 17 so that it will be compressed between said member and the bottom of the socket in the body 1', as said member 17 is slidably arranged in the body and will be pressed downwardly by the rocking movement of the member 6'.

When this arrangement is used in the lubricating system of a rock drill, wear and breakage of the parts, due to the whipping of the oil containing pipe, is prevented, and the oil container has free action in the drill pipe.

It is thought from the foregoing description that the advantages and novel features of my invention will be readily apparent.

A screen 18 may be placed at the upper end of the pipe connection 6 of each form of the invention to strain the liquid entering the connection, the screen being held in place by the supply pipe 7.

What I claim is:—

A coupling of the class described comprising a body having a socket therein, a flanged member seated in the socket, the flanged end having a concaved upper face, a packing ring between the flange and the bottom of the socket, a pipe having a flanged end which fits in the socket, said end being of convex shape to engage the concaved part of the member, a packing ring resting on the flanged end and a nut threaded in the socket for holding the parts therein.

In testimony whereof I affix my signature.

HARRY A. PALLADY.